INVENTOR.
ALBERTO ALVAREZ-CALDERÓN

United States Patent Office 3,179,354
Patented Apr. 20, 1965

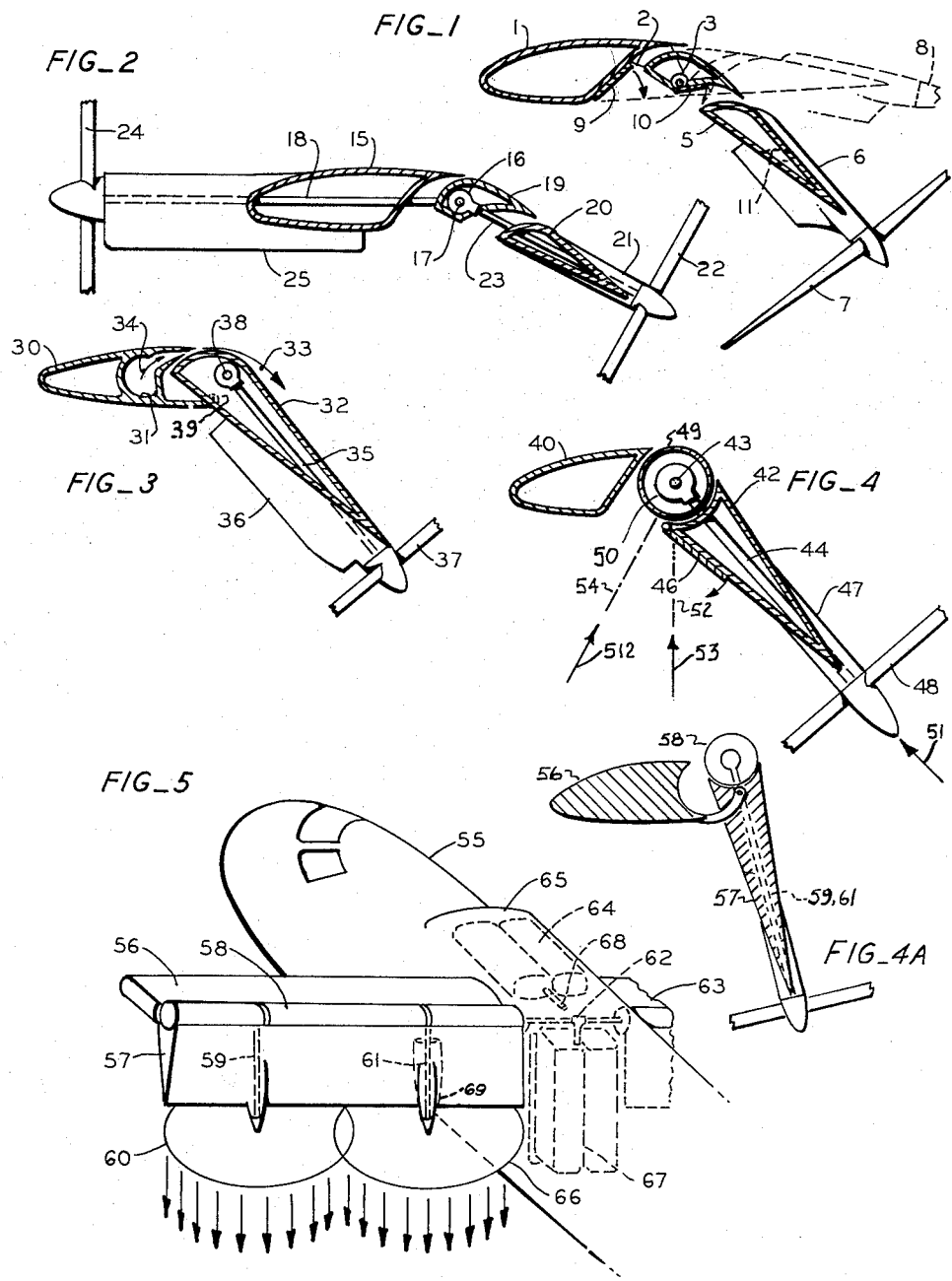
April 20, 1965 — A. ALVAREZ-CALDERÓN — 3,179,354
CONVERTIPLANE AND APPARATUS THEREOF
Filed April 24, 1962 — 3 Sheets-Sheet 1
INVENTOR.
ALBERTO ALVAREZ-CALDERÓN April 20, 1965 A. ALVAREZ-CALDERÓN 3,179,354
CONVERTIPLANE AND APPARATUS THEREOF
Filed April 24, 1962 3 Sheets-Sheet 2
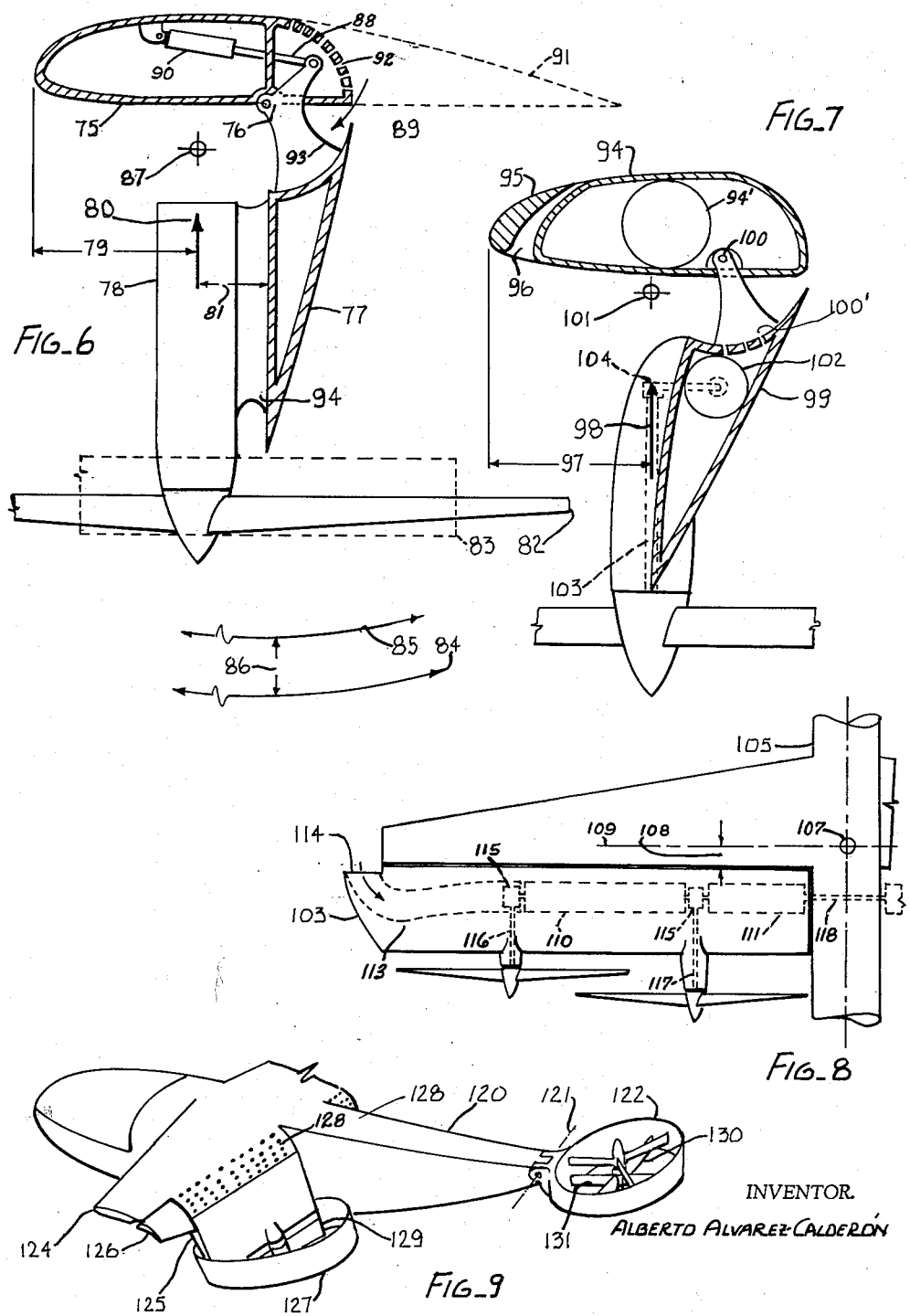
INVENTOR.
ALBERTO ALVAREZ-CALDERÓN

3,179,354
CONVERTIPLANE AND APPARATUS THEREOF
Alberto Alvarez-Calderón, 1560 Castilleja St.,
Palo Alto, Calif.
Filed Apr. 24, 1962, Ser. No. 189,879
13 Claims. (Cl. 244—12)

The present invention is related to vertical take off aircraft (VTOL) and short take off aircraft (STOL). More specifically this invention is related to a new and superior method to obtain VTOL and STOL performance of propeller-driven aircraft.

In the past, VTOL propeller airplanes have used the deflected slipstream system in which a propeller which is mounted ahead of a fixed wing has its slipstream deflected downwards by a flap; or the tilt wing system in which the propellers are mounted ahead of a wing which tilts with respect to the fuselage. Both systems are well known in the art and flying airplanes using them have been built and tested.

A third method of obtaining VTOL for propeller aircraft is to tilt wing mounted propellers with respect to a fixed wing.

These types of systems are illustrated in NASA TND 624 in FIGS. 6 (upper right), 7 and 8 respectively. The third method is also illustrated in the NATO Report Agardograph 46 of June 1960, volume 1, p. 141.

The aerodynamic and structural characteristics and limitations of these systems for VTOL are known. Some of these are:

The deflected slipstream system has the advantage of using a fixed wing but there are aerodynamic losses of energy when the flap is turning the slipstream downwards for hover, and serious pitch problems are present for the aircraft. The latter are partly due to the flap force location in hover and are partly due to normal forces on the propellers in transition.

The fixed-wing tilting propeller system as proposed in the past has an unfavorable interaction in hover between the propeller flow and the wing. One of these unfavorable traits can be observed in FIG. 7 of the aforementioned NATO reference. The arrangement also requires an articulated shafting from the wing-mounted power plants with their safety cross shafting to the tilting propeller shafts.

The tilt wing aircraft since it does not have to turn a slipstream is more efficient aerodynamically in hovering, but structurally it is more complicated in that it does not have a fixed wing. It has also aerodynamic problems of wing flow deterioration in transistion and in steep approaches.

In the present invention a propeller driven VTOL configuration is shown in which the structural and aerodynamic advantages of a fixed wing design are obtained together with hovering aerodynamic efficiency characteristics comparable to that of a tilt wing airplane.

In my new type of propeller VTOL airplane, the propellers are mounted in a pusher installation at specified locations in the trailing edge flap of a fixed wing. The propeller shafts are substantially parallel to the plane of the flap. The flap is mounted on a fixed wing preferably by a simple pivotal hinge and it is of large dimensions. For vertical flight (see FIG. 5) the flap is deflected to a vertical position and therefore there is a vertical lift force due to the propeller's thrust to sustain the aircraft in hover. In this position the thrust force of the propellers should preferably pass through the center of gravity of the airplane; this is obtained with the structures described later in this specification.

For horizontal flight the flap is retracted or turned up to its high speed position trailing the fixed wing portion and the configuration becomes that of a more conventional pusher-propeller type of aircraft.

For transition flight of the VTOL airplane, and for STOL performance, the flap-propeller combination is in an intermediate position (see FIG. 1); here the system has an additional advantage in that the low or decreased pressure just ahead of the propeller draws air towards it and therefore encourages smooth flow on top of the flap and tends to prevent separation and flap stall. This is specially effective for large values of propeller thrusts at slow speeds such as are present for VTOL and STOL operation. In this condition the effect of the propeller is very strong ahead and behind the propeller disc.

Additionally unlike the conventional propellers, in the pusher propellers installation the propeller normal force due to propeller disc angle of attack which acts upward on the propeller and in the plane of the disc, is a stabilizing one since it is located to the rear of the center of gravity. It produces a pitch down effect for a given flap deflection and increasing wing angle of attack. It also tends to counteract the pitch up contributions due to the downwash effects on stability. In my invention, the type of pusher propeller used may be a shrouded propeller, whereby additional contributions of stability and efficiency are obtained from the shroud.

It is an object of this invention to provide a structure for a pusher propeller mounted on the flap of a V/STOL airplane whereby the structural and aerodynamic advantages of a fixed wing airplane can be obtained together with the aerodynamic efficiency of a tilt wing airplane.

Yet one more object of this invention is to provide structure for pusher propellers aircraft with the propellers mounted on the flap and in which the propeller flow field cooperates to improve the aerodynamic characteristics of a high lift flap suitable for VTOL and STOL performance.

Yet another feature of this invention is to locate the flap-mounted propeller of a VTOL and STOL airplane to the rear of the airplane's center of gravity to provide a stable contribution due to propeller normal forces in transition and STOL flight.

Another object of this invention is to provide structure for flap-mounted power plants and pusher propellers for aircraft.

Yet one more object of the invention is to provide a flap mounted pusher shrouded propeller for improved aerodynamic and structural efficiency of the aircraft and its safety of operation in the ground.

One additional feature of the invention is to provide a structure for pusher propeller on flap in which there is unique cooperation between the propulsive, structural, aerodynamic and safety demand of the vehicles by having the power plants and pusher propellers mounted on the flap and interconnecting the latter with high lift spanwise rotating cylinders.

Yet another object of the invention is to provide special air intakes for flap mounted gas turbines for pusher propellers which improve the high speed drag characteristics of the aircraft and which may in addition be discharged efficiently to improve aerodynamic characteristics of the aircraft.

One more object of the invention is to locate the gas turbines for my pusher flap mounted propellers in a spanwise direction, with the additional feature that the shafts of the turbines can be used for propeller interconnection and the intake and exhaust fluids of the turbine can be used for boundary layer control.

These and other objects and features of the invention will become more readily apparent from a perusal of the following description of the embodiments illustrated in the accompanying drawings, in which:

FIG. 1 illustrates in side view an airfoil section having a slotted flap and my flap mounted pusher propeller.

FIG. 2 shows a structure similar to that of FIG. 1 except that a tractor propeller is shown in the wing for cooperation with the pusher propeller on the flap.

FIG. 3 shows a side view of my pusher propeller mounted on a flap having boundary layer control by blowing from the wing.

FIG. 4 shows a side view similar to that of FIG. 3 except that a rotating cylinder is used for propeller interconnection and for boundary layer control.

FIG. 4A shows an alternate structure similar to that of FIG. 4.

FIG. 5 shows a partial perspective view of the structure of FIG. 4A incorporated to a multipropeller V/STOL airplane.

FIG. 6 shows a side view of my pusher propeller installed on a flap in a peculiar arrangement advantageous for hover equilibrium.

FIG. 7 shows a side view of my pusher propeller installed on a flap in an alternate arrangement for hover equilibrium.

FIG. 8 illustrates a partial plan view of the structure of FIG. 7 showing also the location of spanwise gas turbines on the flap.

FIG. 9 shows an embodiment of an alternate structure of the type shown in FIG. 6 in a VTOL/STOL airplane.

Figure 10:
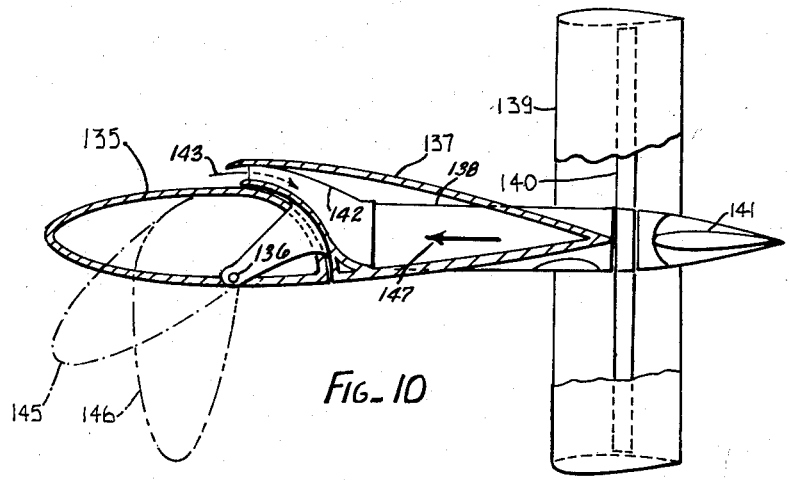
FIG. 10 shows in side view a shrouded pusher propeller mounted on a flap with a gas turbine inside the flap and having a turbine intake mouth located to provide boundary layer control suction.

With initial reference to FIG. 1 I show therein in cross-sectional view a wing profile of my flap mounted pusher propeller V/STOL airplane. Specifically there is shown a fixed wing portion 1 having a flap bracket 2 at its trailing edge. The flap bracket mounts a trailing flap 5 of the double slotted type by means of spanwise pivot axis 3. The forward slot between the trailing portion of the fixed wing and the leading edge of the flap has an upper mouth which opens with flap deflection by virtue of the kinematics of the flap hinge location in reference to the contour of the flap and wing; the pivot axis should be located then approximately as shown in the drawing. The lower intake mouth of the forward slot opens by means of a spanwise door 9 which may be hinged at its upstream end and can close as shown by the arrow to a position in which it forms part of the airfoil contour when the flap is retracted. Such a door may be constructed for instance, according to U.S. Patent 2,117,607. The rear slot on the flap is shown as a fixed slot having a fixed upper exhaust mouth and a spanwise door 10 mounted to open and close the slot's intake mouth. Door 10 is similar to door 9. An optional flap slot 11 is shown in dash lines.

Flap 5 is shown supporting a propeller nacelle 6 and a propeller 7. The propeller nacelle may house a piston motor or a gas turbine.

As shown flap 5 is in a position suitable for STOL and VTOL transition. For vertical flight, the flap is deflected to a vertical position (not shown) whereby the thrust of the pusher propeller is directed vertically upwards. For horizontal flight the flap and nacelle are raised into position 8 and slot doors 9 and 10 are closed, whereby the configuration becomes similar to a standard high speed pusher propeller installation on a wing.

For VTOL aircraft the center of gravity (C.G.) of the aircraft should preferably be adjacent to the line of action of the thrust force when the flap is deflected 90 degrees; in this drawing, the C.G. should preferably be adjacent to the flap's pivot axis. This feature contributes to independence of the propeller's thrust force contribution to pitching moments with respect to flap position, because the thrust force vector would act substantially though the C.G. for all flap positions. There are however, other considerations of stability and ground clearance which are important for propeller location and will be discussed later.

In FIGURE 2, I show a peculiar arrangement of a puller-pusher tandem propeller installation on a VTOL and STOL wing. It has the advantages of increasing the number of propellers available for a given wing span. This reduces the disc loading of the propellers and permits more efficient use of power. Overall size is decreased; this is important for certain purposes, for instance to permit storage or for use on an aircraft carrier's elevator platform. Additionally, the flow rate at the wing is increased substantially, the wing leading edge flow separation is delayed by the forward propeller's slipstream, and the flap's upper surface flow separation is delayed by the favourable pressure gradient established by the rear propeller ahead of its disc.

As shown, the figure has a fixed wing portion 15 having a propeller nacelle 25 housing an engine or gas turbine (not shown) and a puller propeller 24.

The fixed wing portion 15 supports a trailing double slotted flap of the same type as that described in FIG. 1. For clarity, in FIG. 2 the flap support bracket and slot doors have been omitted.

The flap shows a forward flap portion 19 and a rearward flap portion 20, a propeller shaft housing 21 and a pusher propeller 22 at the flap's trailing edge. As shown in this embodiment the pusher propeller is driven by shaft 23 which is connected to the forward propeller and its engine by means of swiveling gear box 16 and forward shaft 18. Bevel gear box 16 should be concentric with flap's pivot axis 17, whereby flap deflection will not interfere with the shaft driving operation of the rear propeller. The chordwise propeller shaft may be interconnected by spanwise shafts for the case of aircraft having more than one set of tandem propellers.

FIG. 3 shows a structure similar to that of FIG. 2, except that boundary layer control (BLC) by blowing is used instead of slots in the flap, to strongly improve the nature of the flow arriving at the pusher propeller with the flap deflected.

BLC is important and advantageous because a turbulent flow arriving at the propeller from a stalled flap would decrease the propeller efficiency and could even cause propeller vibrations. Since BLC improves flap flow conditions, then it is of particular advantage for this type of installation.

Specifically, there is shown in FIG. 3 a fixed wing 30 supporting at spanwise axis 39 a plain flap 32. Spanwise axis is located approximately 30% of the wing's chord. Flap 32 supports pusher propeller 37 and propeller gas turbine 36. For multi-propeller installations, the propellers should be interconnected by a spanwise shaft to insure symmetric thrust with unsymmetric powerplant failure, therefore the propeller shaft 35 is shown entering into a spanwise interconnection shaft 38 by means of a bevel gear box.

Blowing BLC is shown on the wing just ahead of the flap by means of spanwise air duct 31 which discharges high speed air 34 into a BLC slit and outwardly tangentially to the flap along path 33.

The BLC installation may be of conventional design known in the art, for instance, that shown in U.S. Patent 2,844,337 of July 22, 1958.

FIG. 4 is similar to FIG. 3 but it uses a spanwise rotating cylinder for BLC and/or for propeller interconnection to insure symmetric thrusts from a multipropeller installation. Specifically there is shown a fixed wing portion 40 supporting a pivoted flap 42. The cylinder rotates about spanwise axis 43 which is also the pivot axis of flap 42. For BLC purposes there is shown a spanwise rotating cylinder 49 which is also used to transmit power from a remote powerplant (not shown in this figure) to propeller shaft 44 by means of bevel gear box 50. Propeller shaft 44 is supported by shaft housing 47 and drives pusher propeller 48. To close the lower slot gap between wing and flap there is provided a flap door 46. It is very important to note that since the peripheral speed of the cylinder has a minimum value when compared to the local airspeed at the flap for flow improvements, a pusher propeller installation which does not blow high speed air into the flap's knee permits a lower peripheral speed in the cylinder for a given flap deflection and therefore it also diminishes the rotational speed of the cylinder. Both features are structurally very advantageous.

The details of the cylinder installation, bevel gears, shafting, slot doors, etc., may be of the type described in my application 164,848 of January 8, 1962, now Patent No. 3,121,544, and will be omitted here.

FIG. 4 has been shown with the flap at about 45° deflection suitable for STOL and VTOL transition, with the thrust vector indicated as 51. For vertical flight the flap should be deflected by about 90 degrees, as shown by alternate line 52 and thrust vector 53. For steep approaches, the flap should be deflected by angles greater than 90°. As shown in the figure it may be deflected by about 120° to flap position 54 and thrust vector 512.

FIG. 4A is an alternate structure to that of FIG. 4, and shows the same type of installation except that the rotating cylinder 58 is mounted on the leading edge of flap 57. Flap 57 is evidently aerodynamically balanced, according to my structure of FIG. 5 of my application 48,038, now Patent No. 3,092,354.

In FIG. 5 I show in a perspective partial view the embodiments of my flap-mounted pusher propeller VTOL airplane. While the arrangement shown in the figure is generally applicable with any of the flaps and BLC systems shown in the specification, it is shown illustrating the embodiment of FIG. 4A. Specifically FIG. 5 shows a fuselage 55 mounting a fixed wing 56. The wing mounts a flap 57 and a spanwise rotating cylinder 58 between the flap and the wing. The flap also mounts propellers 60 and 66 which have propeller chordwise shafts 59 and 61 suitably connected to rotating cylinder 58. Cylinder 58 is connected across the fuselage to cylinder 63 in the right wing (right wing shown only partially) and to the interconnecting system of the right wing propellers (not shown in the figure, but would be the mirror image of the left wing system).

The pusher propellers may be driven by a pair of gas turbines symmetrically disposed about the fuselage and on the flaps; for instance, see turbine 69 on left wing. Alternately, a pair of gas turbines 67 may be mounted vertically inside the fuselage with a common drive shaft to gear box 62 driving the spanwise shaft and cylinders. Turbine 67 may be mounted inside the fuselage to pivot about an axis collinear with the flap's pivot axis, or may be fixedly mounted to the fuselage.

Another alternate arrangement is shown by pair of turbines 64 having air intake 65 and common drive shaft 68.

The turbines described earlier should preferably be free turbines and may be connected to the cylinder by means of the various cylinder connections and shafting connections referred to with respect to my aforementioned application 164,849.

FIG. 6 shows a cross-section of a wing mounting on its flap my pusher VTOL propeller. This view gives some details of stability in pitch. Specifically, the figure shows a fixed wing portion 75 mounting on spanwise pivot axis 76 a flap 77 by means of flap bracket 93. Below the flap is mounted on a pylon structure 94 a propeller nacelle 78 which may house a gas turbine and/or gear arrangements for propeller 82. The propeller axis is substantially parallel to the lower surface of the flap. As shown the flap is deflected 90 degrees and the propeller thrust 80 acts vertically through the airplane center of gravity C.G. 87. The C.G. is at 28% of the wing chord in this example as shown by the distance 79, and the propeller thrust axis is at a predetermined distance 81 equal to 12% of the wing chord away from lower surface of the flap. By virtue of distance 81, it is possible to have the vector 80 act through C. G. 87 and yet retain a large fixed wing chord 75 of about 55% of the overall wing chord with the flaps up.

The figure shows a pusher propeller having a propeller tip 82 which describes a circular arc 84 when the flap is deflected about axis 76. Obviously the ground clearance required from the landing gear is related to this arc and therefore it is convenient to minimize the diameter of the pusher propeller. One convenient way to obtain this which in addition has other advantages is to use a shrouded pusher propeller, as suggested by dash lines 83. It is known that a smaller diameter shrouded propeller can produce as much thrust as a larger unshrouded propeller. Hence for the pusher installation there would be no thrust disadvantage in using smaller shrouded propeller. It is seen in the figure that with a shrouded propeller installed, the arc described by the tip of shroud 83 with flap deflection follows a circular path line 85. By comparing arcs 85 and 84, it can be seen that a significant length reduction 86 in landing gear size for a given ground clearance would be obtained by using a shrouded propeller. Furthermore the use of a shrouded propeller would improve safety for ground support personnel who may otherwise walk into the propeller and get killed. This is therefore of considerable practical advantage.

Another advantage of the shrouded propeller is that the aid speed at the disc of the propeller is larger than that of the unshrouded propeller and therefore the favourable pressure gradient ahead of the disc which improves the flow over the top of the flap is stronger and more beneficial.

Other details of significance in FIG. 6 is the use of a distributed suction on the flap's knee to secure attached flap flows for STOL and VTOL transition. Thus the wing shows a suction chamber 88 and skin pores 92 which are progressively covered by the flap's upper lip as the flap is retracted.

Also for vertical flight, there is shown a gap between the flap's upper lip and the lower surface of the wing to prevent the formation of a low pressure area below the wing by providing a slot to leak air 89 below the wing; for horizontal flight, flap actuator 90 displaces flap 77 about axis 76 to position 91 wherein it forms the rear airfoil complement for wing 75.

FIG. 7 shows a structure similar to that of FIG. 6 except that the propeller axis is not parallel to the lower surface of the flap, and the gas turbines are located in a spanwise direction inside the flap.

Specifically, FIG. 7 shows a fixed wing portion 94 having a leading edge slat 95 and high lift slot 96. Portion 94 supports a flap 99 at axis 100. There is shown also a C.G. 101 at 28% of the wing chord. In order to have the thrust of the propeller pass through the C.G. when the former is directed vertically upwards, while retaining a large fixed wing chord of 55% of the total flaps-up wing chord and avoiding using a pylon like in FIG. 6, the propeller nacelle in FIG. 7 is mounted on the flap with a negative incidence angle 98 with respect to the flap such that when the flap is deflected by an angle slightly larger than 90 degrees, the propeller thrust acts vertically upwards through the C.G. as shown. Thus distance 97 is also 28% of the wing chord.

Additionally, FIG. 7 shows a peculiar installation of an axial gas turbine in the flap with its axial direction in a spanwise direction. Since many of the new axial turbines are long they may be not convenient for an installation of the turbine in a normal chordwise direction. Additionally, for VTOL and STOL multipropeller airplanes, spanwise shafts in the wing are necessary for propeller interconnection. By the arrangement of FIG. 7, the turbines are arranged in tandem in a spanwise direction within the flap of a wing. Thus, for my pusher propeller VTOL, the gas turbines are mounted in a spanwise direction as shown by turbine 102, and it is connected to the propeller shaft 103 by gear box 104 shown schematically; special extra turbine air intakes for hover are shown as 100$^1$. Also shown in FIG. 7 is a spanwise turbine 94$^1$ on the fixed wing portion of the wing. This illustrates such a mounting which would be advantageous for known or conventional tilt wing, deflected slipstream and tilt propeller VTOL/STOL aircraft, or for pusher flap mounted propellers with appropriate shafting.

The use of spanwise flap mounted gas turbines is discussed again in the description of FIG. 8.

FIG. 8 is a structure of the type of FIG. 7 but not identical with it since it also incorporates other features.

FIG. 8 shows in partial planform view some wing sweep and taper characteristics suitable to improve the pitch equilibrium conditions in hover and the structural characteristics of the wing. The figure shows a central fuselage 105 and an airplane C.G. 107. The fuselage is shown with a left fixed wing portion 104 which is swept back and tapered, and a flap 103 which is substantially unswept and not tapered. The flap may be of the general type of say that of FIG. 7 and has a flap pivot axis 109. It is seen that by sweeping the fixed wing portion the distance 108 between the substantially unswept flap pivotal axis and a spanwise axis through C.G. 107 can be reduced. By making distance 108 (which is analogous to distance 81 in FIG. 6) small, then it is easier to have the thrust line of the propellers (which is either below, or at a negative incidence to the flap) act through the C.G. for 90 degree flap deflection. Yet there is retained a large fixed wing chord specially near the root of the wing.

In FIGURE 8 there is also shown the peculiar gas turbine installation inside the flap and in a spanwise direction which was discussed in reference to FIG. 7. This aspect of FIG. 8 shows spanwise turbine 110 connecting chordwise propeller shafts 116 and 117 by means of suitable gear boxes 115 which may be conventional gear boxes. Additionally, there is seen spanwise gear turbine 111 in tandem with turbine 110. From the former there extends spanwise interconnecting shaft 118 which connects to the right wing; it is omitted from the drawing but it is the mirror image of the left wing shown. Also shown is high speed turbine air intake 113 for air 114.

It should be carefully noted that such flap turbine installation is peculiarly adapted for blowing and/or suction boundary layer control on wings and flap. For example, the discharge of turbine 111 can be ducted to the upper forward surface of the flap for flow reenergizing. Such arrangements are known is the art hence will be omitted here. A suction BLC installation is exemplified later. The point of importance in that respect is that BLC is simplified with the gas turbines mounted on the flap.

FIG. 9 shows a partial perspective view of a VTOL aircraft having a pusher propeller of the type shown in FIG. 6, and including a novel and superior tail unit. Specifically the figure shows a fuselage 120 having a fixed wing 124 with its inboard portion mounting a flap 125. Flap 125 supports shrouded propeller 127 and pitch trim and/or control surface 129 which is a flapevator of the type described in my application 165,794 of January 12, 1962.

Its detail will be omitted here. Wing 124 shows a distributed suction area 128 ahead of the flap which may be of conventional design, and outboard of the main flap it has a conventional high lift trailing edge device 126 which can also serve as aileron for high speed flight.

At the tail of the fuselage there is shown a peculiar and novel installation of a tilting shrouded propeller which serves for pitch and yaw control for both vertical and horizontal flight. Specifically, the shrouded propeller 122 is mounted on the fuselage to tilt on its lower shroud portion about axis 121. Pitch control for vertical flight is provided by varying the pitch of the propeller. The position of the tail propeller also allows for a wide range of C.G. travel. Yaw control is provided by surface 131 in the slipstream.

By tilting gradually the tail's shrouded propeller throughout the transition regime, the effects of downwash variations due to the wing mounted pusher propellers are not adverse on this tail, as would be the case normally for a fixed conventional tail mounted close to the wing.

For high speed flight, shrouded propeller 122 is placed upwards to a vertical position in which case it acts to provide for yaw and pitch stability and control. Pitch control is effected by surface 130. It is of importance to note that such a tail-mounted shrouded tilting propeller is of clean aerodynamic design and extremely efficient for many types of VTOL vehicles, including conventional tilt wing airplanes, fan in wing airplanes, etc.

In FIG. 10, I show in a side view a peculiar arrangement of a flap-mounted pusher propeller for VTOL in which the intake of the engine is used for boundary layer control. Specifically the figure shows a fixed wing portion 135 mounting on spanwise pivot axis 136 a flap 137. The flap supports a gas turbine 138, a shrouded propeller 140 and shroud 139 at the flap's trailing portion, and a pitch trim and/or control flapevator 141. Observe that the gas turbine air intake 142 is located at the forward upper edge of the flap and it sucks air by path 143 which includes the boundary layer of fluid accumulating on the fixed wing's upper surface from its leading edge. This suction provides two advantages: for flap deflected positions, the removal of the boundary layer ahead of the flap promotes attached flows on the flap's upper surface. For the flap's retracted position, the removal of the wing's boundary layer permits a new laminar boundary layer on the upper surface of the flap. Now it is known that a laminar boundary layer produces less drag than a turbulent one, hence this position of the intake reduces high speed skin drag. In fact, nearly all of the upper surface of the wing flap combination can retain laminar flow conditions by this arrangement.

In FIG. 10 there is also shown alternate relative positions of the fixed wing portions with respect to the flap: position 145 is illustrative of transistion and STOL flight, and position 146 is illustrative of vertical flight. In the latter position propeller thrust vector 147 should preferably act through the aircraft's center of gravity, and the latter should be adjacent to the aerodynamic center of the shroud wing flap combination.

Figure 11:
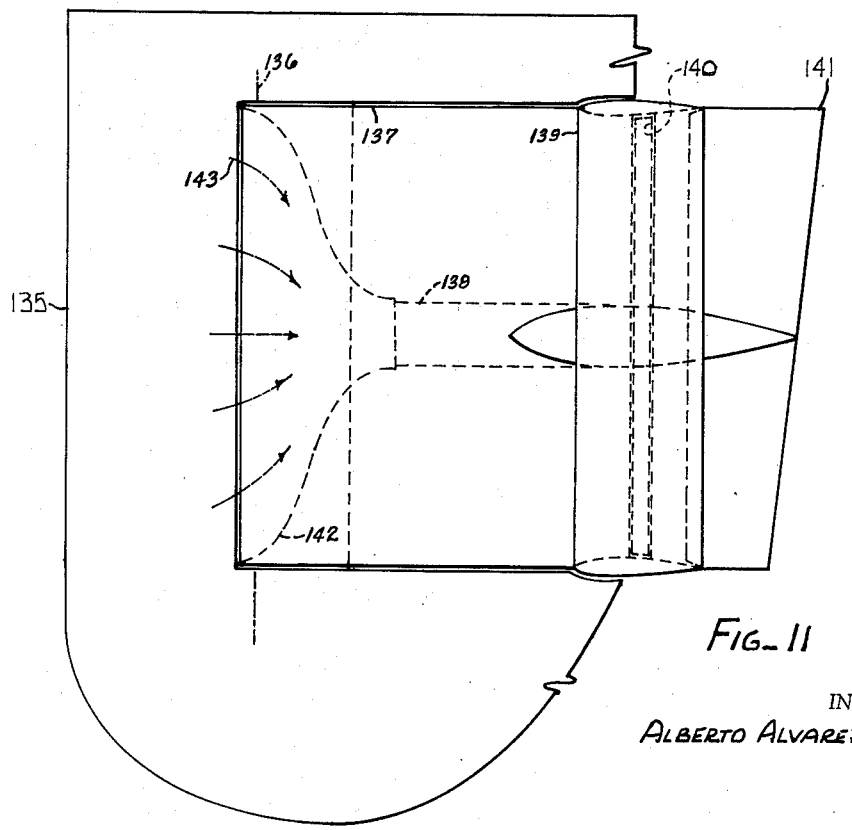
FIG. 11 shows a planform view of the structure of FIG. 10.

FIG. 11 shows a plan view of the structure of FIG. 10. Of special interest is the planform view of the shape of the intake of air 142 for gas turbine 138. It is seen that the intake extends over the entire span of the flap ahead of the shrouded propeller. Air is taken in by paths 143. The distribution of the intake's cross area (area perpendicular to the flow direction) should preferably be a contracting one to secure smooth flow arriving to the gas turbine compressor. In the figure, the ejection of the gases from the turbine can be by a conventional duct. It should be carefully observed however, that in an alternate arrangement not shown in the drawings, the exhaust of the gas turbines may be discharged by a ducting system which would be in planform shape substantially that of a mirror image of the intake ducting system, with the exhaust mouth facing rearwards at the trailing edge of the wing or flap. A plurality of such intake-gas turbine-exhaust arrangements along the span of a wing or flap of a high speed pure jet or ramjet aircraft would permit the use of the turbine's gaseous exhaust to form a continuous jet sheet or jet flap on the lifting surface's trailing edge. One advantage of such a system is that it permits an uninterrupted structural continuity in the forward portion of the wing. Also, it minimizes the effects of powerplant failure on the jet flap by virtue of the number of turbines used, it permits the use of extensive laminar flow on the wing's upper surface due to the peculiar mid chord intake, and has a short, efficient discharge ducting system for the flap. The discharge of course may be used for boundary layer control of a high lift trailing edge device. An aircraft incorporating such an integrated high-lift low-drag propulsive system should preferably use a plurality of small gas turbines on its wing, and offers a unique and superior configuration in which none of the usual pods and bulbous appendices which characterized today's high speed aircraft would appear.

It is pertinent before closing the specification to discuss some of the general features and characteristics of the flap-mounted pusher propeller V/STOL system.

As mentioned earlier in the specifications, by mounting a pusher propeller on a suitably designed high lift flap and controlling the flap deflection angle, there is obtained a simple method to direct the propeller thrust in any desired direction with excellent aerodynamic efficiency. Yet, a fixed wing configuration is retained. The aerodynamic efficiency and characteristics result from the structure chosen and its arrangements.

It is seen that the embodiments of the invention show generally a large flap chord and a relatively small wing chord. One advantage of such proportions is that it locates the negative pressure peak of the flap near the center of gravity which results in important advantages for stability in transition. Another important advantage of an unusually large flap chord is to minimize the area of the wing structure on top of the propeller disc in the hovering condition. If a conventional type of wing were used and below the wing a propeller were mounted vertically to produce vertical lift forces, then the low pressure area on top of the propeller disc would manifest itself on the lower surface of the wing tending to pull down the wing. This effect, which would subtract from total lift, is minimized in my invention by using a very large flap which in addition to mounting directly the propeller etc., when deflected downwards, obviously subtracts from the area of the structure remaining on top of the propeller. Furthermore, with a large flap the propeller can be mounted at a large distance below the fixed wing. Also, approximately half of the propeller disc is completely without obstructions on top of it, and the size of the remaining obstruction is minimized. Excellent aerodynamic efficiency is obtained this way. In addition, as mentioned earlier, there is a cooperation between the pressure field developed by the propeller which has a large and constant proportion of its disc area projecting above the flap for all flap positions and the air flow above the wing and flap. This is important for STOL and VTOL transition.

It is seen then, that the peculiar flap wing proportions are related to the special characteristics of the vehicle and are not related to standard flap theory for conventional wings. Finally, in structural contradistinction to tilting propellers mounted on, above or below fixed wings rather than on flaps and having their powerplants attached to the wings, in my invention, the pusher propellers and in most cases even their engines are mounted on the flap itself. Therefore the propellers need not tilt with respect to their engines, the engines need to tilt with respect to their supports, but the complete flap and propulsive system can be constructed without special gears and shafting, and it can be operated and maintained as a unit. Evidently such flap will be heavier than normal flaps but this is desirable to the extent that their weight acts to minimize flap hinge moments and wing torsional loads produced by flap and propeller aerodynamic normal forces.

In some of the structure, special arrangements have been shown to provide "built in" boundary layer control in unique cooperation between the systems structural propulsive and aerodynamic requirements (FIGS. 4 and 10, specially).

Considerable detail has been given to the proportions of the flap, wing, wing planform, propeller and shrouds, and to the location of center of gravity and thrust vectors etc. In fact, the drawings can be interpreted as substantially scale drawings in which the scale factor is the overall wing chord. These drawings however, are specified by way of example and not by way of limitation.

Other embodiments of the invention which are not shown in the drawings are structures mounting pusher propellers on conventional flaps of normal size, say of about 40% overall wing chord or less. This arrangement would be excellent for STOL operations. In this case, the engine may be mounted in a spanwise direction on the flap, or on the wing in a conventional fashion, with swiveling shafts. With the propeller shafts extended beyond the flap's trailing edge, they can also be used for VTOL but complications of hover equilibrium and of ground clearance could be present for long shaft extensions unless special measures are taken such as a larger landing gear and special pitch time devices such as tail rotors lifting nose rotors in the fuselage, tail jets, etc.

Other arrangements also shown in the figures are the installation of my pusher propellers on aerodynamically balanced flaps with boundary layer control of the type described in my application 48,038 of August 8, 1960. Evidently, such an installation could be done by relating the information available in that application and in this one.

The use of the term "fixed wing portion" in this specification denotes that the wings in the structures shown are not helicopter blades, but is not used to exclude the type of wings in which the forward main portion of the wing referred to as "fixed portion" and ahead of the flap is installed on a fuselage such as to tilt with respect to the fuselage. Such wing tilt, say of the order of 20 or 30 degrees would be useful for STOL and to minimize wing-propeller interference in hover. In fact, a conventional type of tilt wing tilting by angles of the order of 90 degrees to a fuselage but with pusher propellers mounted on the wing, with boundary layer control at the wing's leading edge, and a flaperator surface trailing the propellers (shrouded or unshrouded) for pitch trim and/or control, would be of considerable advantage in VTOL transition, and in reducing the overall height of the VTOL aircraft with the wing vertically upwards. The latter feature is of importance for storage, aircraft carrier installations, etc.

It is also advantageous for my pusher propellers to install just ahead and behind the plane of the disc small surfaces which are twisted or can be moved with respect to the plane of the disc such as to improve the efficiency of the propellers both in hover and high speed by pre-directing the flow direction arriving to the disc and leaving it. Such surfaces can have the functions of a fixed or variable incidence stators just ahead and behind the disc, and in the plane of the wing; for the case of shrouded propellers, such surface are also incorporated inclined to the wing to form part of the shroud support structure.

Various further modifications and alterations from those described hereinabove can obviously be made without departing from the spirit of this invention, and the foregoing is to be considered purely an an exemplary application thereof. The actual scope of the invention is to be indicated by reference to the appended claims.

I claim:

1. A fluid sustained vehicle having a lifting member with an upper surface, a leading edge, a lower surface and a trailing movable portion thereon, and a fluid moving impeller mounted on said trailing movable portion, said impeller having an axis of rotation and impeller blades with blade tips rotating about said axis of rotation with said tips describing a circle concentric to said axis, said circle having a constant portion of its area above said trailing movable portion and a constant portion of its area below said trailing movable portion, and means provided to vary the position of said trailing movable portion with respect to said lifting member.

2. The structure of claim 1 further characterized in that gas turbine powerplants are mounted on said trailing movable portion, said gas turbines having an axial direction which is positioned generally parallel to a spanwise dimension of said trailing movable portion.

3. The structure of claim 1 characterized further in that said trailing movable portion is a flap having a lower surface and said fluid moving impeller is a pusher propeller having an axis of rotation positioned on said flap below said lower surface.

4. The structure of claim 3 characterized further in that said vehicle has a longitudinal dimension substantially parallel to its normal direction of motion, a center of gravity located at approximately the same longitudinal position as that of the quarter chord of the mean aerodynamic chord of said lifting member, and the resultant thrust vector of said propeller when said flap is deflected downwards by approximately ninety degrees has a line of action with a location substantially immediately adjacent to that of said center of gravity.

5. The structure of claim 1 characterized further in that said trailing movable portion is a flap having an upper surface, a lower surface and a middle plane substantially equidistant to said upper and lower flap surfaces, and said impeller has said axis inclined at a negative incidence angle with respect to said middle plane of said flap.

6. The structure of claim 5 characterized further in that said vehicle has a longitudinal dimension substantially parallel to its normal direction of motion, a center of gravity located at approximately the same longitudinal position as that of the quarter chord of the mean aerodynamic chord of said lifting member, and the resultant thrust vector of said impeller when said flap is deflected downwards by approximately ninety degrees has a line of action with a longitudinal position substantially immediately adjacent to that of said center of gravity.

7. The structure of claim 1 further characterized in that said impeller has a tubular ring around said blades mounted on said movable portion substantially concentric with said axis.

8. The structure of claim 1 further characterized in that said impeller is driven by a powerplant having an air intake duct which removes the boundary layer air immediately adjacent to the upper surface of said lifting member.

9. The structure of claim 1 further characterized in that boundary layer control means on said lifting member are driven by an axle of said impeller concentric with said axis.

10. The structure of claim 1 further characterized in that at least two impellers are mounted on said movable trailing portion with chordwise impeller drive shafts driven by at least one gas turbine having an axial turbine shaft in a spanwise direction and connecting said drive shafts.

11. The structure of claim 10 further characterized in that said gas turbine is mounted on said movable trailing portion.

12. The structure of claim 1 further characterized in that a powerplant is mounted on said lifting member and shaft means are provided between said impeller and said powerplant.

13. The structure of claim 12 further characterized in that a tractor propeller is mounted on said lifting member opposite to said trailing movable portion, and shaft means are provided connecting said tractor propeller with said powerplant and with said impeller.

References Cited by the Examiner
UNITED STATES PATENTS 2,961,188 11/60 Taylor _____ 244—12
2,982,495 5/61 Griffith _____ 244—42.41 X FERGUS S. MIDDLETON, *Primary Examiner.*

MILTON BUCHLER, *Examiner.*